D. G. WYETH.
FIFTH-WHEEL.

No. 176,415. Patented April 18, 1876.

WITNESSES:
W. W. Hollingsworth
John C. Kenon

INVENTOR:
D. G. Wyeth
BY
ATTORNEYS.

UNITED STATES PATENT OFFICE.

DAVID G. WYETH, OF NEW WAY, OHIO.

IMPROVEMENT IN FIFTH-WHEELS.

Specification forming part of Letters Patent No. 176,415, dated April 18, 1876; application filed March 3, 1876.

*To all whom it may concern:*

Be it known that I, DAVID G. WYETH, of New Way, in the county of Licking and State of Ohio, have invented a new and Improved Carriage-Coupling; and I do hereby declare that the following is a full, clear, and exact description of the same, reference being had to the accompanying drawing, forming a part of this specification, in which—

Figure 1:
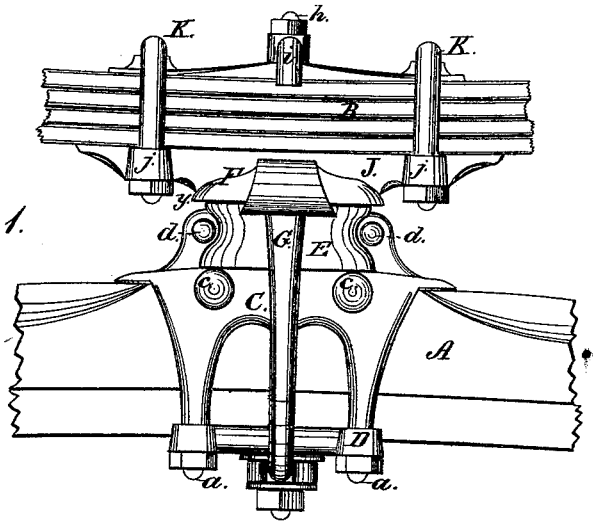
Figure 2:
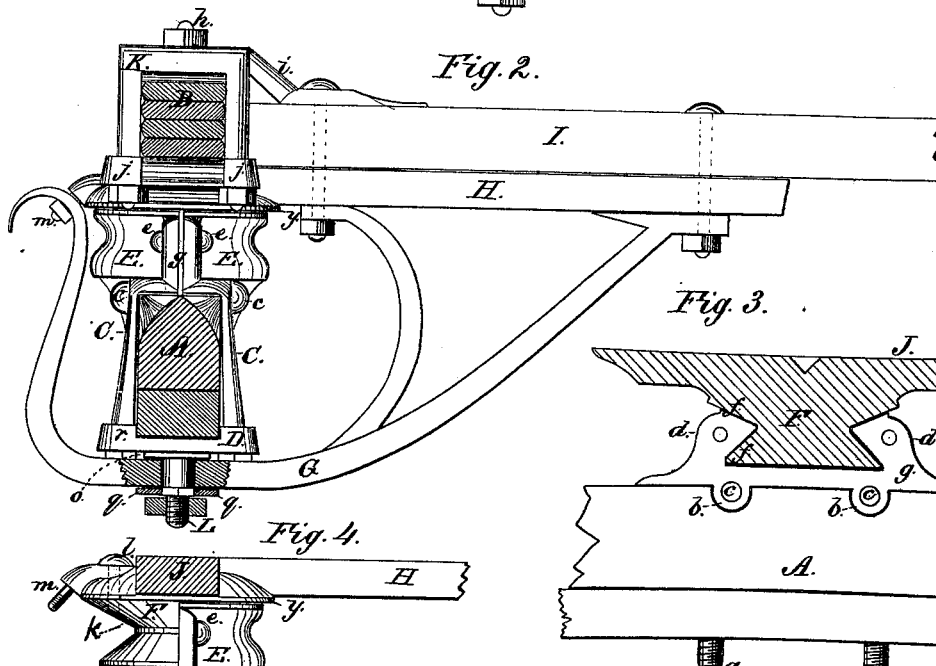
Figure 3:
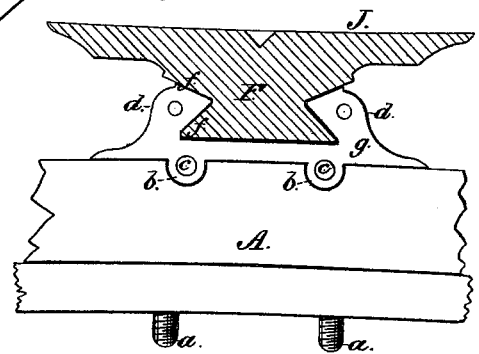
Figure 4:
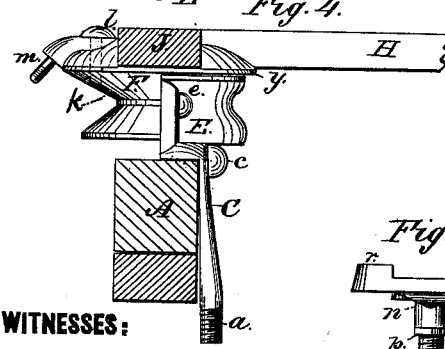
Figure 5:
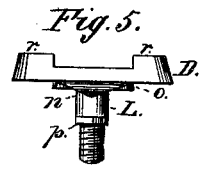

Figure 1 is a front elevation; Fig. 2, a side elevation with the spring and axle in section; Fig. 3, a sectional detail of the coupling taken from the front; Fig. 4, a detail of the side of the coupling with one of the sections of the socket removed; Fig. 5, end detail of the clip-plate D.

The object of my invention is to provide an improved swivel-coupling for connecting the front spring and axle of carriages and wagons, and to be applicable also to vehicles having platform-couplings. It consists in the peculiar construction of a swivel-bearing provided with additional means of connecting and securing the parts together, the same being designed to take the place of the fifth-wheel, king-bolt, and head-block, and its connection used on carriages or other vehicles.

In the drawing, A represents the axle, and B the spring, of a carriage or other vehicle, which are to be fastened together so as to allow the axle to turn freely. The coupling consists of a set of detachable clips, C, which encompass the axle and are fastened below by a clip-plate, D, and above by bolts. The upper parts of these clips are formed into a socket or cup, E, in which swivels a bearing, F, attached to a bearing-plate for the spring, the whole being strengthened by a brace, G. The clips C and socket-sections E are made in two pieces, and are provided with stems $a$, which are fastened below the axle by the plate D, which plate is recessed upon the side next to the axle, and provided with edge-flanges $r$, which extend up over the sides of the axle and prevent it from being displaced by the brace. The plate D is perforated at its corners to receive the stems $a$ of the clips, and is held in place by the pressure of the brace, or it may be also held by nuts upon the end of stems $a$. The upper portion of the clips forming the socket or cup-sections are provided with subjacent enlargements $b$, which are let into the upper portion of the axle and are perforated with eyes to receive the bolts $c$, which pass through from one side of the clip to the other and hold them tightly together. The socket-sections also have ears $d$ upon each side, which are, for additional security, also fastened together by bolts $e$. The interior of the cup or socket-sections is made with two bevels $f, f'$, to prevent the withdrawal of the bearing which is made of a corresponding shape, and the cup is made in two sections so as to admit of the lateral insertion of said bearing. When connection of the bearing with the socket becomes loose from wear this divisibility allows the parts of the socket to be detached and their adjacent faces dressed off, which reduces the size of the socket and compensates for the wear. The said socket receives oil for lubricating the bearing and reducing friction through a hole in the bearing F, and for the purpose of preventing leakage the two sections are fitted together with a packing of leather, $g$, between, for the purpose of making an oil-tight joint. The bearing F is made with two bevels, which correspond to the bevels of the socket and fit nicely therein, the lower bevel being the steepest. This arrangement not only holds the device together but makes a durable connection, for the reason that it makes a larger bearing-surface, the friction being distributed both upon the upper bevel and the bottom of the bearing. Said bearing is attached to a T-shaped plate whose shank H extends along beneath the under side of the reach I, and whose cross-head J forms the seat for the spring, and between which and the spring a piece of leather may be interposed to prevent creaking. The reach abuts against the spring, and is attached to it by means of a bolt, $h$, passing through a brace, $i$, in the place of which may be used the T-shaped plate ordinarily employed. The seat J is counter-sunk to receive the end of the bolt $h$, and is also provided with perforated ears $j$, through which pass the stems of clips K, which pass around the spring and secure it to the said seat or bearing-plate. These perforated ears $j$ may be cast upon the bearing-plate, or they may be formed upon bars and placed in grooves in the under side of said plate. Through the upper flange of the bearing F is made an inlet, $k$, for the oil, which is closed by a screw-plug, $l$. To shed the water and mud more perfectly from the swiveled bearing, the bearing-plate F is constructed with a lip or extension, $y$, overhanging the same. This is of great importance for excluding mud from the bearing, especially when the vehicle rocks. The brace G extends around and beneath the axle, and is provided with two branches, which fasten by bolts in the rear to the bottom of the shank of the T-shaped plate. Its upper and front end is curved and perforated, and is attached to a lug, $m$, formed on the upper edge of the bearing F. The middle lower portion of the brace is perforated, and swivels upon a central stud, L, which is attached to the bottom of the clip-plate D, which plate is also braced and strengthened by the projections $n$. The stud L is made round with a raised base-piece or permanent washer, $o$, to take up the wear produced by the frequent turning, and while the body of the stud is made round to permit turning it is squared near its end at $p$, and then rounded again to a smaller size to receive the nut. Upon the square portion between the brace and the nut is placed a washer, $q$, having a squared hole to fit the square end of the stud, and the object of this arrangement is to prevent the frequent turning of the brace from unscrewing the nut from frictional contact, for the washer being held rigid upon the stud it presents any movement of the surface adjacent to the nut, and thus obviates the unscrewing of the same. The coupling, as thus described, is so arranged that, in turning, the wheels strike the side guards before they can interfere with or strike against the brace, and the devices are thus protected from injury or derangement.

The advantages of my improved coupling are neatness of design and finish, strength, durability, and freedom from creaking.

Having thus described my invention, what I claim as new is—

1. The socket E having two interior bevels, and made in two detachable parts with the clips C, in combination with the bearing F for the spring, having two bevels, as and for purpose described.

2. The combination of the bearing F having lug $m$, the T-shaped plate H and J attached to the bearing F, and the brace G extending around the axle and fastened to the shank H in the rear, and the lug $m$ in front, as and for the purpose described.

3. The combination, with the detachable socket sections E and clips C, of the clip-plate D, having side flanges $r$, and the brace G, as and for the purpose described.

4. The round stud L formed on the bottom of plate D, and having a raised base, $o$, and a square end, $p$, in combination with the perforated brace G, the retaining nut, and a washer, $q$, having a square hole placed over the square end of the stud, as and for the purpose described.

5. The combination of the T-shaped plate carrying the double inclined bearing F, the sectional socket E with clips C, having two internal bevels, and fastened together by bolts, the clip-plate D securing the lower ends of clips, and the brace G passing around the axle and secured to the T-shaped plate upon one side, and the bearing F upon the other, as described.

DAVID G. WYETH.

Witnesses:
S. G. DeCrow,
S. S. Wyeth.